A. SMITH.
PUNCTURE CLOSING DEVICE FOR PNEUMATIC TIRES.
APPLICATION FILED OCT. 31, 1910.

998,413.  Patented July 18, 1911.

WITNESSES:
Samuel E. Wade
Amos W. Hart

INVENTOR
ABRAHAM SMITH.
BY Munn & Co.

ATTORNEYS

UNITED STATES PATENT OFFICE.

ABRAHAM SMITH, OF STUART, NEBRASKA.

PUNCTURE-CLOSING DEVICE FOR PNEUMATIC TIRES.

998,413.   Specification of Letters Patent.   Patented July 18, 1911.

Application filed October 31, 1910. Serial No. 589,860.

*To all whom it may concern:*

Be it known that I, ABRAHAM SMITH, a citizen of the United States, and a resident of Stuart, in the county of Holt and State of Nebraska, have invented certain Improvements in Puncture-Closing Devices for Pneumatic Tires, of which the following is a specification.

My invention is an improved device in the nature of a compressible metal clamp for closing rents, slits, and punctures in the inner inflatable tubes of elastic tires used on automobiles and auto-cycles. The same is constructed and applied as hereinafter described, and illustrated in the accompanying drawing, in which—

Figure 1:
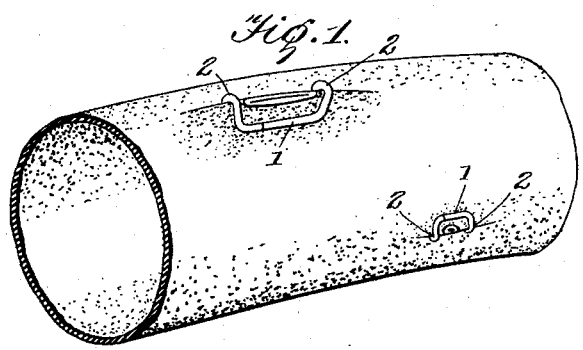
Figure 2:
Figure 3:
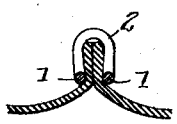
Figure 4:
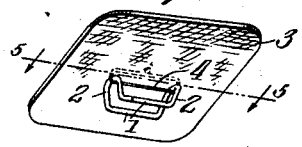
Figure 5:

Figure 1 is a perspective view of a section of a pneumatic tire with my device applied to rents or slits therein. Fig. 2 is a perspective view of the device detached. Fig. 3 is a cross section of a portion of a pneumatic tire and of the clamp applied thereto. Fig. 4 is a perspective view illustrating a modification; and Fig. 5 is a longitudinal section on the line 5—5 of Fig. 4.

As shown in Fig. 2, the device is constructed of stout wire, its body consisting of two straight parallel portions 1 which are separated laterally by a narrow space, and the curved connecting ends being upturned at an angle of fifty or more degrees. I desire it understood, however, that this angle may be widely varied and the ends 2 of the clamp may, in fact, be projected inward at an angle, instead of outward.

The device is formed from a due length of flexible wire which is bent into the required shape and its abutting ends preferably soldered together, although they may overlap as shown in Fig. 2.

In applying the device to a pneumatic tire for the purpose of closing the edges of a rent, slit, or puncture, the said edges are drawn and held together, and the device is slipped over the same, so that the body portions 1 lie on opposite sides of the slit and below the same, as shown in Figs. 1 and 3. The device is then compressed and thereby clamped firmly in place by means of suitable pliers or pincers, the edges of the opening being thus clamped firmly together and closed air-tight—see especially Fig. 3.

The wire or metal bar of which the device is constructed not being elastic to any considerable degree, but merely flexible, it is apparent the device will yield readily to considerable pressure and will retain the position or form into which it is compressed, and the portions of the elastic tire edges which lie between the body portions 1 will yield more or less, so that the said portions 1 are embedded in the tire to a certain extent, which aids in holding the clamp more securely in place.

The device thus constitutes a simple, inexpensive, and quickly applicable emergency device for closing holes in pneumatic tires and is also highly reliable in use.

In Figs. 4 and 5, I show a piece of leather, fabric, or other suitable material 3 which may be applied and attached to the clamp for the purpose of guarding and cushioning the tire at the point of puncture where the device is applied. The same may be attached to the clamp by means of a small wire 4, or by any other suitable means.

What I claim is:—

1. The improved device for the purpose specified, comprising a clamp formed of metal capable of holding its form under compression and having a body portion consisting of separated but parallel parts, and connecting end portions which diverge laterally from the body, all constructed integrally, as shown and described.

2. The improved device formed of flexible wire and having straight parallel body portions which terminate in bowed ends that project above the plane of the body, as shown and described.

3. In combination, with a metal clamp for the purpose specified, formed of body portions and upwardly projecting connecting end portions, of a cushion piece formed of flexible material, and means for attaching it to the ends of the clamp, substantially as described.

ABRAHAM SMITH.

Witnesses:
L. J. C. REICHARD,
FRED L. BARCLAY.

Copies of this patent may be obtained for five cents each, by addressing the "Commissioner of Patents, Washington, D. C."